United States Patent
Kamiya

(10) Patent No.: US 9,830,559 B2
(45) Date of Patent: Nov. 28, 2017

(54) MACHINE LEARNING UNIT, SPINDLE REPLACEMENT JUDGING DEVICE, CONTROLLER, MACHINE TOOL, PRODUCTION SYSTEM, AND MACHINE LEARNING METHOD, WHICH ARE ABLE TO JUDGE NECESSITY OF SPINDLE REPLACEMENT

(71) Applicant: FANUC CORPORATION, Yamanashi (JP)

(72) Inventor: Yohei Kamiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/222,950

(22) Filed: Jul. 29, 2016

(65) Prior Publication Data

US 2017/0032283 A1    Feb. 2, 2017

(30) Foreign Application Priority Data

Jul. 31, 2015   (JP) ................................ 2015-151880

(51) Int. Cl.
| | |
|---|---|
| G06N 99/00 | (2010.01) |
| G01B 21/02 | (2006.01) |
| G01M 13/00 | (2006.01) |

(52) U.S. Cl.
CPC .......... *G06N 99/005* (2013.01); *G01B 21/02* (2013.01); *G01M 13/00* (2013.01)

(58) Field of Classification Search
None
See application file for complete search history.

(56) References Cited

U.S. PATENT DOCUMENTS

| 6,161,055 A * | 12/2000 | Pryor ................. G05B 19/4065 |
| | | 382/152 |
| 2005/0234586 A1 | 10/2005 | Agapiou et al. |
| 2006/0089920 A1 | 4/2006 | Ramesh et al. |

(Continued)

FOREIGN PATENT DOCUMENTS

| JP | 5-52712 A | 3/1993 |
| JP | H05208343 A | 8/1993 |

(Continued)

*Primary Examiner* — Alan Chen
(74) *Attorney, Agent, or Firm* — Hauptman Ham, LLP

(57) ABSTRACT

A machine learning unit capable of judging the necessity of replacement of a spindle of a machine tool. A machine learning unit includes a state observing section observing a state variable comprising processing volume data showing a number of processed workpieces, processing accuracy data showing a difference between an actual dimension of a processed workpiece and a dimension target value, interruption time data showing a time period of interruption of operation of the machine tool, and replacement determination data showing a judgment result of a necessity of spindle replacement; and a learning section provided with profit-and-loss data comprising a profit per unit time or a loss per unit time, generated by a production of the processed workpiece, and a loss per unit time generated due to the spindle replacement. The learning section uses the profit-and-loss data and the state variable and learns a condition associated with the spindle replacement.

14 Claims, 8 Drawing Sheets

(56) References Cited

U.S. PATENT DOCUMENTS

| | | | |
|---|---|---|---|
| 2016/0091393 A1* | 3/2016 | Liao | B23Q 17/0995 |
| | | | 702/34 |
| 2016/0341631 A1* | 11/2016 | Kamiya | G01M 13/00 |
| 2017/0006135 A1* | 1/2017 | Siebel | H04L 67/02 |

FOREIGN PATENT DOCUMENTS

| | | | |
|---|---|---|---|
| JP | 2001337708 A | 12/2001 | |
| JP | 2001350510 A | 12/2001 | |
| JP | 2011186910 A | 9/2011 | |
| JP | 2013179109 A | 9/2013 | |
| JP | 2014223700 A | 12/2014 | |
| WO | 9819821 A1 | 5/1998 | |

* cited by examiner

MACHINE LEARNING UNIT, SPINDLE REPLACEMENT JUDGING DEVICE, CONTROLLER, MACHINE TOOL, PRODUCTION SYSTEM, AND MACHINE LEARNING METHOD, WHICH ARE ABLE TO JUDGE NECESSITY OF SPINDLE REPLACEMENT

RELATED APPLICATIONS

The present application claims priority to Japanese Patent Application Number 2015-151880 filed Jul. 31, 2015, the disclosure of which is hereby incorporated by reference herein in its entirety.

BACKGROUND OF THE INVENTION

1. Field of the Invention

The present invention relates to a machine learning unit able to judge the necessity of spindle replacement. The present invention further relates to a spindle replacement judging device able to judge the necessity of spindle replacement. The present invention further relates to a controller able to judge the necessity of spindle replacement. The present invention further relates to a machine tool able to judge the necessity of spindle replacement. The present invention further relates to a production system able to judge the necessity of spindle replacement. The present invention further relates to a machine learning method able to judge the necessity of spindle replacement.

2. Description of the Related Art

Abnormal operation (e.g., vibration, uneven rotation, etc.) of a spindle of a machine tool (e.g., a machining center, a lathe, etc.) would have a direct impact on the processing accuracy of a workpiece, and therefore, when the extent of the abnormal operation exceeds an allowable range, it is required to replace the spindle with a new one. Conventionally, an operator has judged, according to an experimental rule, whether or not the extent of the abnormal operation exceeds an allowable range, based on the operator's sensing of abnormal noise or vibration generated during operation of the spindle or the measurement of a difference between an actual dimension of a processed workpiece which has been processed using the spindle and a dimension target value. On the other hand, as described in, e.g., Japanese Unexamined Patent Publication No. H5-052712 A (JP H5-052712 A), a malfunction predicting system for production machinery, which compares a vibration pattern as a detected value of a vibration sensor provided in the production machinery with a predetermined reference vibration pattern in a normal condition so as to predict the malfunction of the production machinery, has been known.

SUMMARY OF THE INVENTION

It is desirable to make it possible to correctly judge whether or not the extent of an abnormal operation of a spindle of a machine tool exceeds an allowable range, and therefore, whether or not it is necessary to replace the spindle with a new one, without relying on a detection value which is easily affected by disturbance, such as the detected value of a vibration sensor.

One aspect of the present invention is a machine learning unit configured to learn a condition associated with replacement of a spindle of a machine tool, the machine learning unit comprising a state observing section configured to observe a state variable representing a current state of a spindle, during a continuous operation of a machine tool, the state variable comprising processing volume data showing a total number of processed workpieces which are processed using the spindle, processing accuracy data showing a difference between an actual dimension of a processed workpiece and a dimension target value, interruption time data showing a time period of interruption of operation of the machine tool, and replacement determination data showing a judgment result of a necessity of spindle replacement; and a learning section provided with profit-and-loss data, the profit-and-loss data comprising a profit per unit time or a loss per unit time, which may be generated by a production of the processed workpiece, and a loss per unit time which may be generated due to the spindle replacement, the learning section configured to use the profit-and-loss data and the state variable and learn a condition associated with the spindle replacement.

Another aspect of the present invention is a spindle replacement judging device configured to judge a necessity of replacement of a spindle of a machine tool, the spindle replacement judging device comprising a machine learning unit according to the aforementioned aspect; and a decision making section configured to output an action indicator indicating either one of an intention that the spindle replacement is necessary in the current state and an intention that the spindle replacement is not necessary in the current state, based on a result of learning performed by the learning section, wherein the state observing section is configured to observe the state variable which has been changed in accordance with the action indicator output by the decision making section, wherein the learning section is configured to use the changed state variable so as to learn the condition, and wherein the decision making section is configured to output the action indicator which has been optimized in accordance with the state variable under the learned condition.

Still another aspect of the present invention is a controller of a machine tool having a spindle, the controller comprising a spindle replacement judging device according to the aforementioned aspect; and a data acquiring section configured to acquire the processing volume data, the processing accuracy data, the interruption time data and the replacement determination data.

Still another aspect of the present invention is a machine tool comprising a spindle; and a spindle replacement judging device according to the aforementioned aspect, or a controller according to the aforementioned aspect.

Still another aspect of the present invention is a production system comprising a plurality of machine tools, each machine tool having a spindle; and a network configured to connect the plurality of machine tools with each other, wherein at least one of the plurality of machine tools is configured as a machine tool according to the aforementioned aspect.

Still another aspect of the present invention is a production system comprising a plurality of machine tools, each machine tool having a spindle; a machine learning unit according to the aforementioned aspect; and a network configured to connect the plurality of machine tools and the machine learning unit with each other.

Still another aspect of the present invention is a machine learning method of learning a condition associated with replacement of a spindle of a machine tool, the machine learning method comprising the acts, executed by a CPU of a computer, of observing a state variable representing a current state of a spindle, during a continuous operation of a machine tool, the state variable comprising processing volume data showing a total number of processed workpieces which are processed using the spindle, processing accuracy data showing a difference between an actual dimension of a processed workpiece and a dimension target value, interruption time data showing a time period of interruption of operation of the machine tool, and replacement determination data showing a judgment result of a necessity of spindle replacement; providing profit-and-loss data comprising a profit per unit time or a loss per unit time, which may be generated by a production of the processed workpiece, and a loss per unit time which may be generated due to the spindle replacement; and using the state variable and the profit-and-loss data and learning a condition associated with the spindle replacement.

The machine learning unit according to one aspect is configured to use the result of a learning executed by the learning section, so that it is possible to correctly judge whether or not the extent of an abnormal operation of the spindle of the machine tool exceeds an allowable range, and therefore, whether or not it is necessary to replace the spindle with a new one, without relying on a detection value which is easily affected by disturbance, such as the detected value of a vibration sensor.

The spindle replacement judging device, the controller, the machine tool, the production system and the machine learning method, according to the other aspects, have effects analogous to the aforementioned effects of the machine learning unit.

BRIEF DESCRIPTION OF THE DRAWINGS

The objects, features and advantages of the present invention will become more apparent from the following description of the embodiments in connection with the accompanying drawings, wherein.

DETAILED DESCRIPTION

Figure 1:
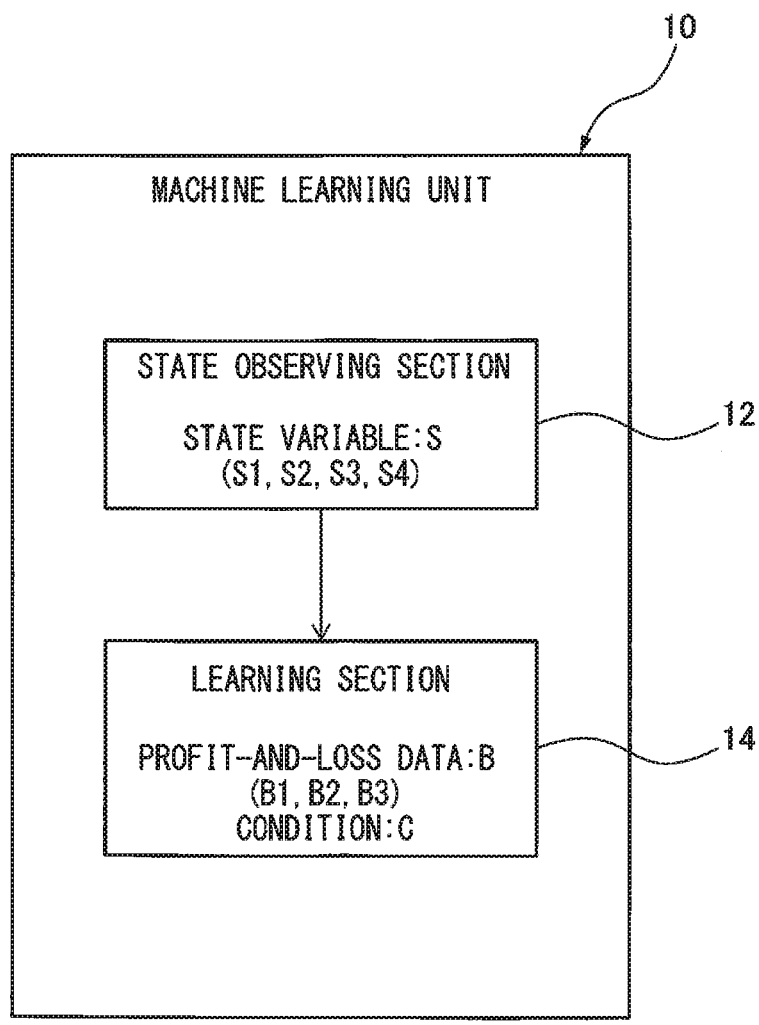
FIG. 1 is a functional block diagram depicting a machine learning unit according to one embodiment.

Embodiments of the present invention will be described below with reference to the accompanying drawings. Throughout the drawings, corresponding components are denoted by common reference numerals.

FIG. 1 depicts a machine learning unit 10 according to one embodiment. The machine learning unit 10 includes software (a learning algorithm, etc.) and hardware (a CPU (central processing unit) of a computer, etc.), provided for learning by itself a condition C associated with replacement of a spindle (not depicted) of a machine tool (e.g., a machining center, a lathe, etc.) through so-called "machine learning". The condition C learned by the machine learning unit 10 corresponds to a model structure representing a correlativity between a current state of the spindle of the continuously operating machine tool and an action of replacing the spindle or not replacing the spindle in the current state. Alternatively, the condition C may be considered to correspond to various parameters for determining the model structure. Note that in the present application, "replacement of a spindle (or spindle replacement)" is defined as an action performed after interrupting the continuous operation of a machine tool when the extent of abnormal operation (e.g., vibration, uneven rotation, etc.) of the spindle exceeds an allowable range. According to this definition, the "condition C associated with replacement of a spindle" may be restated as a condition associated with a state where the extent of abnormal operation of the spindle exceeds an allowable range (i.e., malfunction of the spindle). Further, the judgment as to whether or not replacement of a spindle is necessary may be deemed to be substantially synonymous with the prediction of the malfunction before the spindle actually breaks down.

As depicted by functional blocks in FIG. 1, the machine learning unit 10 includes a state observing section 12 configured to observe a state variable S representing the current state of the spindle, during the continuous operation of the machine tool, the state variable S including processing volume data S1 showing a total number of processed workpieces which are processed using the spindle, processing accuracy data S2 showing a difference between an actual dimension of a processed workpiece and a dimension target value, interruption time data S3 showing a time period of interruption of the operation of the machine tool, and replacement determination data S4 showing a judgment result of the necessity of spindle replacement; and a learning section 14 provided with profit-and-loss data B, the profit-and-loss data B including a profit B1 per unit time or a loss B2 per unit time, which may be generated by a production of the processed workpiece, and a loss B3 per unit time which may be generated due to the spindle replacement. The learning section 14 is configured to use the profit-and-loss data B provided in itself and the state variable S observed by the state observing section 12 and learn the condition C associated with the spindle replacement, in accordance with any learning algorithm generally referred to as "machine learning".

The state observing section 12 may be configured as, e.g., one of the functions of a CPU of a computer. In the state variable S observed by the state observing section 12, the processing volume data S1 can be obtained as numerical data which is incremented by "1" each time a processing process for a single workpiece completes, by using, e.g., a number count function provided in a controller (not depicted) of the machine tool. Conventionally, an operator predicts that, according to an experimental rule, the more the number of processed workpieces, the higher the extent of the abnormal operation of the spindle.

The processing accuracy data S2 can be obtained each time a processing process for a single workpiece completes, by using, e.g., a dimension measuring device provided to the machine tool, which measures an actual dimension of a processed workpiece in a two or three dimensional manner. The processing accuracy data S2 may be just the difference between the actual dimension of the processed workpiece and the predetermined dimension target value of the processed workpiece, may be a ratio of the difference to the dimension target value, or may be an index representing the difference by dividing it into several levels of any different ranges (e.g., three levels of large, medium and small ranges). If a dimensional tolerance should be considered, the processing accuracy data S2 may be a result of comparison of the difference of the actual dimension of the processed workpiece and the dimension target value with the predetermined tolerance of the processed workpiece, which may be represented in the form of a numerical value, ratio, level, etc. Conventionally, an operator predicts that, according to an experimental rule, the worse the processing accuracy, the higher the extent of the abnormal operation of the spindle.

The interruption time data S3 can be obtained each time the operation of the continuously operating machine tool is interrupted, by using, e.g., a timer function provided in a controller of the machine tool. The state observing section 12 does not grasp factors that the operation of the machine tool is interrupted, but observes all interruption times by considering them as interruption times occurring in connection with the replacement work of a spindle. In other words, the occurrence of the interruption time is synonymous with a fact that the spindle has been replaced. Conventionally, an operator performs, according to an experimental rule, the replacement work of the spindle when he judges that the extent of abnormal noise or vibration occurring during the spindle operation exceeds an allowable range.

The replacement determination data S4 can be obtained as a result of the judgment of the necessity of the spindle replacement, by, e.g., checking whether an alarm function provided in a controller of the machine tool informs a demand for the spindle replacement.

The learning section 14 may be configured as, e.g., one of any functions of a CPU of a computer. The profit-and-loss data B provided in the learning section 14 can be obtained by using the data of the state variable S observed by the state observing section 12 through the execution of a predetermined calculation. In the profit-and-loss data B, the profit B1 per unit time, which may be generated due to the production of the processed workpiece, can be calculated by, e.g., the following Formula 1, using income "I" per a single processed workpiece, of which the difference between the actual dimension and the dimension target value is within the allowable range (e.g., within the tolerance) (such a processed workpiece also referred to as a "good workpiece", in the present application), the income being planned in a commercial transaction; coefficient "f" of the completion degree of the good workpiece (e.g., a ratio of the difference between the actual dimension and the dimension target value with the dimension target value), which can be obtained from the processing accuracy data S2; and number "n" of the processed workpieces (or the good workpieces) per unit time, which can be obtained from the processing volume data S1:

$$B1[\text{workpiece profit}]=I \times f \times n \quad \text{Formula 1}$$

The loss B2 per unit time, which may be generated due to the production of the processed workpiece, can be calculated by, e.g., the following Formula 2, using the sum of loss generated as a result of the processing of a processed workpiece, of which the difference between the actual dimension and the dimension target value exceeds the allowable range (e.g., exceeds the tolerance) (such a processed workpiece also referred to as a "defective workpiece", in the present application) (the loss including processing cost "Pc" and material cost "Mc" of the defective workpiece); and number "n" of the processed workpieces (or the defective workpieces) per unit time, which can be obtained from the processing volume data S1:

$$B2[\text{workpiece loss}]=(Pc+Mc) \times n \quad \text{Formula 2}$$

In this connection, the processing cost Pc of the defective workpiece can be calculated by converting a time, an electric power, a tool wear volume, etc., consumed by the processing, into a cost.

The loss B3 per unit time, which may be generated due to the spindle replacement, can be calculated by, e.g., the following Formula 3, using cost "Ec" for the spindle replacement (the cost including parts cost, labor charge, etc.); and a cost corresponding to a profit obtainable when assuming that the good workpieces are continuously produced without replacing the spindle with a new one over time "h" required for the spindle replacement (the time corresponding to an interruption time of the operation of the machine tool) (the cost represented as "h×I×f×n"):

$$B3[\text{spindle loss}]=Ec/(\text{unit time})+h \times I \times f \times n/(\text{unit time}) \quad \text{Formula 3}$$

During a time period when the machine tool processes a large number of workpieces in a continuous operation by using the spindle, the learning section 14 identifies a feature implying a correlativity between the current state (i.e., the state variable S) of the spindle and the necessity or unnecessity of the spindle replacement, based on a data set including the profit-and-loss data B obtained for each of the workpieces and the state variable S, while referring to profit and loss (i.e., the profit-and-loss data B), generated by the spindle in the current state. At the time of starting a learning algorithm, the correlativity between the spindle current state and the necessity or unnecessity of the spindle replacement is unknown. However, as learning progresses with a goal of increasing the profit B1 while decreasing the loss B2 or B3, in the profit-and-loss data B, the feature is gradually identified and the correlativity is interpreted. If the correlativity between the spindle current state and the necessity or unnecessity of the spindle replacement is interpreted to a certain reliable level, learning results repeatedly output from the learning section 14 can be used to perform a selection (i.e., a decision-making) of an action such that the spindle in the current state should be replaced before starting a subsequent processing or it should not be replaced but continues to perform a subsequent processing, on the premise of generating the profit B1, rather than the loss B2 or B3. In other words, along with the progress of the learning algorithm, the learning section 14 can make the condition C gradually approach an optimum solution, the condition C representing the correlativity between the current state of the spindle of the machine tool in the continuous operation and the actions of replacing and not replacing the spindle in the current state.

As explained above, the machine learning unit 10 has a configuration wherein the learning section 14 uses the state variable S observed by the state observing section 12 and the profit-and-loss data B provided in the learning section 14 so as to learn the condition C associated with the spindle replacement in accordance with the machine learning algorithm. The state variable S is configured by data less affected by disturbance, i.e., the processing volume data S1, the processing accuracy data S2, the interruption time data S3 and the replacement determination data S4. Further, the profit-and-loss data B is unambiguously determined by a predetermined calculation by using the data of the state variable S. While the processing accuracy data S2 may depend on, e.g., the measurement accuracy of the dimensions of the processed workpiece, which in turn depends on the capability of a dimension measuring device, it is expected that the high-precision processing accuracy data S2 can be observed. Therefore, according to the machine learning unit 10, by using the result of the learning executed by the learning section 14, it becomes possible to correctly judge whether or not the extent of an abnormal operation of the spindle of the machine tool exceeds an allowable range, and therefore, whether or not it is necessary to replace the spindle with a new one, without relying on a detection value easily affected by disturbance, such as the detected value of a vibration sensor, and also on the experimental rule of an operator.

The machine learning unit 10 having the above configuration may also be configured so that the learning section 14 uses state variables S and profit-and-loss data B, which are obtained in connection respectively with a plurality of machine tools having the identical mechanical construction, and learns a condition C common to all of the machine tools. According to this configuration, it is possible to increase the amount of a data set including the state variable S and the profit-and-loss data B, obtained during a certain time period, so that it is possible to improve the learning speed or reliability of the condition C with an input of a more diverse data set.

Figure 2:
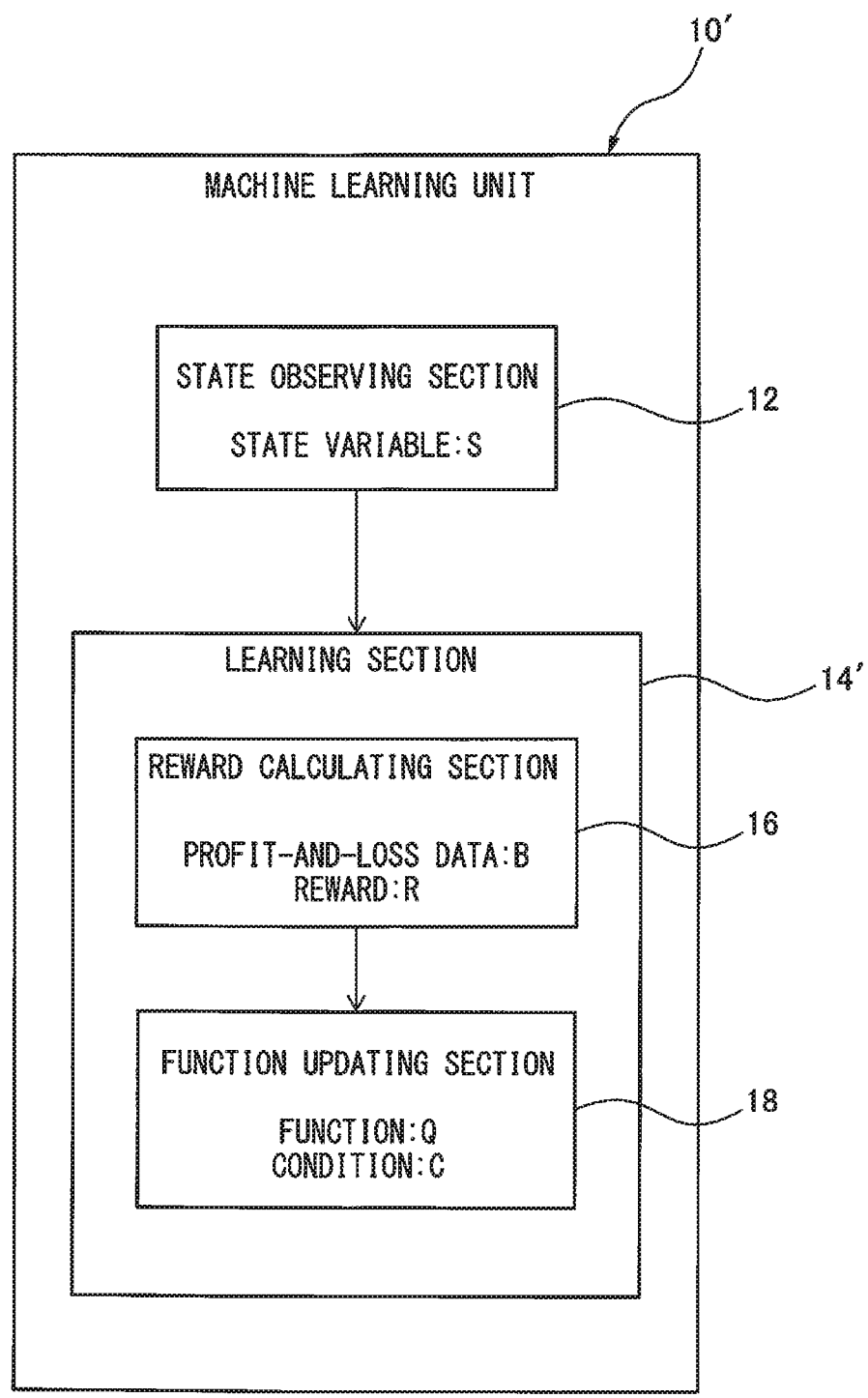
FIG. 2 is a functional block diagram depicting a machine learning unit according to another embodiment.

In the machine learning unit 10 having the above configuration, a learning algorithm executed by the learning section 14 is not particularly limited, and a known learning algorithm, such as supervised learning, unsupervised learning, reinforcement learning, neural network, etc., may be employed. FIG. 2 depicts a machine learning unit 10' according to another embodiment, which includes a learning section 14' executing reinforcement learning as one example of a learning algorithm.

In the machine learning unit 10' depicted in FIG. 2, the learning section 14' includes a reward calculating section 16 configured to calculate the profit-and-loss data B based on the state variable S and thereby determine a reward R for an action relating to the spindle replacement in the current state, and a function updating section 18 configured to use the reward R and update a function Q representing a value of the said action in the current state. The learning section 14' is configured to learn the condition C associated with the spindle replacement when the function updating section 18 repeatedly updates the function Q.

One example of an algorithm of reinforcement learning executed by the learning section 14' will be explained. The algorithm according to this example is known as "Q-learning", which is configured to use, as independent variables, state "s" of an action subject and action "a" which can be selected by the action subject in the state "s", and learn a function Q(s, a) expressing the value of an activity when the action "a" is selected in the state "s". The optimum solution is selecting action "a" which makes the value function Q the highest in state "s". The Q-learning is started in a situation where a correlativity between state "s" and action "a" is unknown, and a trial-and-error process for selecting various actions "a" in any state "s" is repeated, so that the value function Q is repeatedly updated and approaches the optimum solution. In this connection, the algorithm may be configured so that, when an environment (i.e., state "s") changes as a result of selecting the action "a" in the state "s", a reward "r" depending on the environment change (i.e., the weighting of the action "a") is received, and the learning is guided so as to select the action "a" which enables a higher reward "r" to be received, whereby it is possible to make the value function Q approach the optimum solution in a relatively short time.

Generally, the updating formula of the value function Q can be expressed as follows:

$$Q(s_t, a_t) \leftarrow Q(s_t, a_t) + \alpha \left( r_{t+1} + \gamma \max_a Q(s_{t+1}, a) - Q(s_t, a_t) \right)$$

In the above formula, variables $s_t$ and $a_t$ indicate a state and an action at a time "t", and the state changes to $s_{t+1}$ due to the action $a_t$. Variable $r_{t+1}$ indicates a reward received due to the change of the state from $s_t$ to $s_{t+1}$. The term including "maxQ" means a value Q which becomes maximum by performing the action "a" at the time "t+1" (more specifically, it is predicted at the time "t" that the action "a" will make a value Q maximum). Characters $\alpha$ and $\gamma$ respectively indicate a learning coefficient and a reduction rate, and are arbitrarily set in $0 < \alpha \leq 1$, $0 < \gamma \leq 1$.

In the case where the learning section 14' performs the Q-learning, the spindle corresponds to an action subject, the state variable S observed by the state observing section 12 corresponds to state "s" in the updating formula, the action of replacing a spindle and the action of not replacing a spindle correspond to action "a" in the updating formula, and the reward R determined by the reward calculating section 16 corresponds to reward "r" in the updating formula. Accordingly, the function updating section 18 repeatedly updates a function Q expressing the value of the action of replacing the spindle in the current state as well as a function Q expressing the value of the action of not replacing the spindle in the current state, by the Q-learning using the reward R.

As the reward R determined by the reward calculating section 16, the profit-and-loss data B calculated based on the state variables S can be directly used. In this case, the reward R is equivalent to either one of the values of a profit B1 per unit time, which may be generated by the production of the processed workpiece, a loss B2 per unit time, which may be generated by the production of the processed workpiece, and a loss B3 per unit time, which may be generated due to the spindle replacement, while depending on the current state of the spindle represented by the state variable S. Alternatively, the value of the profit-and-loss data B multiplied with a predetermined coefficient may be used as the reward R. The function updating section 18 can treat the profit B1 as a positive (or plus) reward R, and also can treat the losses B2 and B3 as a negative (or minus) reward R.

The function updating section 18 may have an action value table orderly listing the state variable S, the profit-and-loss data B and the reward R, as being related to action values expressed by the function Q (e.g., numerical values). In this case, the act of updating the function Q performed by the function updating section 18 is synonymous with the act of updating the action value table performed by the function updating section 18. At the start of the Q-learning, the correlativity between the spindle current state and the necessity or unnecessity of the spindle replacement is unknown, so that the action value table is prepared in such a manner that the various state variables S and the profit-and-loss data B and rewards R corresponding thereto are related to the values (or the functions Q) of randomly determined action values. Note that the reward calculating section 16 can immediately calculate the corresponding profit-and-loss data B and reward R if the state variable S is once grasped, and the calculated values B and R are written into the action value table.

When proceeding with the Q-learning while defining the profit B1 in the profit-and-loss data B as a positive reward R and the loss B2 or B3 in the profit-and-loss data B as a negative reward R, the learning is guided in a direction of selecting an action enabling a higher reward R to be received, and depending on the state of the environment (i.e., the state variables S of the spindle), which changes as a result of performing the selected action in the current state, the value (or function Q) of the action value regarding an action performed in the current state is rewritten and the action value table is updated. By repeating this updating operation, the value (or function Q) of the action value listed in the action value table is rewritten in such a manner that the value becomes greater the more the action generates the profit B1 rather than the loss B2 or B3. In this way, the previously unknown correlativity between the spindle current state and the necessity or unnecessity of the spindle replacement gradually becomes clear, and the condition C representing the correlativity between the current state of the spindle of a continuously operating machine tool and the actions of replacing and not replacing the spindle in the current state gradually approaches an optimum solution.

Figure 3:
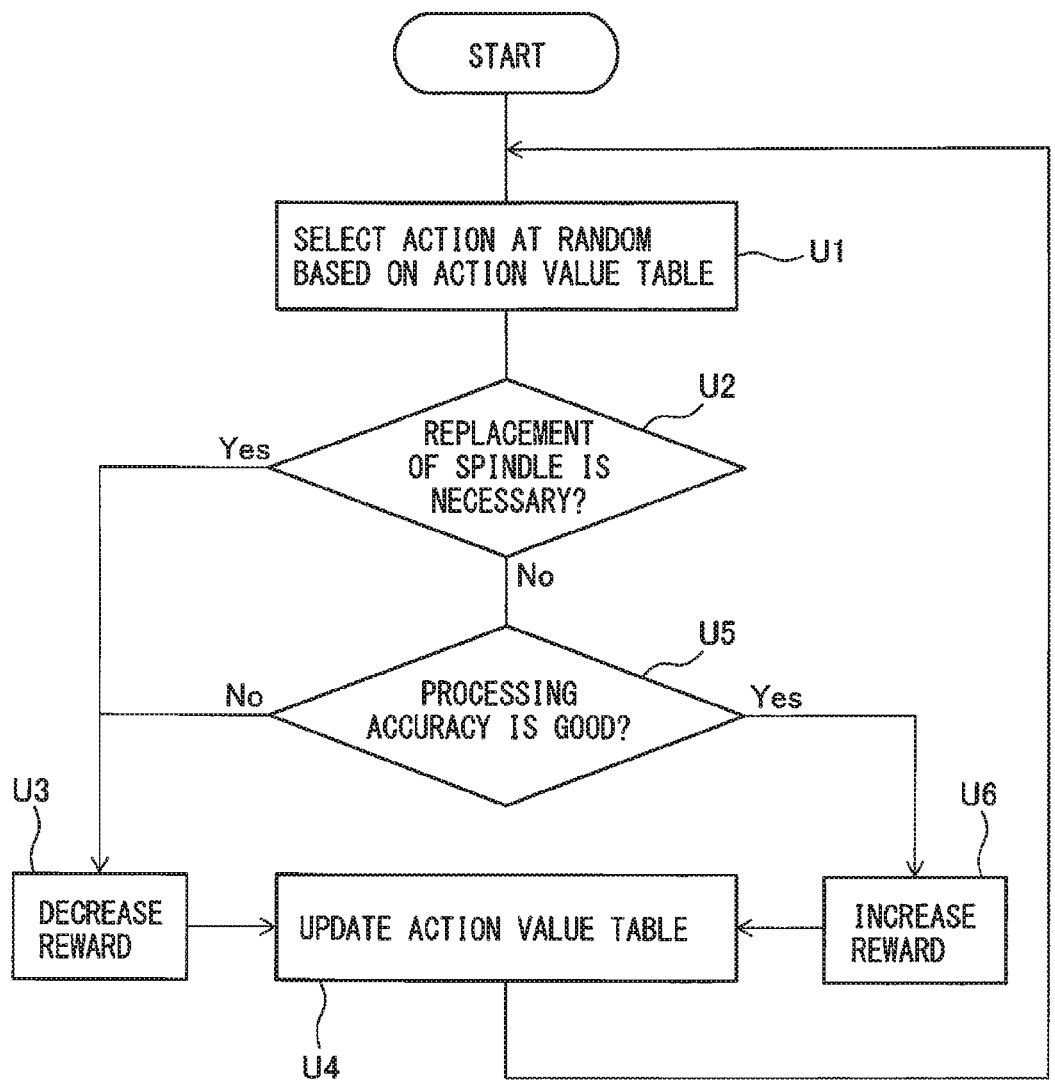
FIG. 3 is a flow chart depicting one example of a learning method executed by a learning section.

Referring to FIG. 3, the flow of the aforementioned Q-learning executed by the learning section 14' will be further explained. First, at step U1, the function updating section 18 refers to the action value table at that point of time, and randomly selects either an action of replacing the spindle or an action of not replacing the spindle, as an action to be performed in the current state represented by the state variable S observed by the state observing section 12. Next, at step U2, the function updating section 18 extracts the replacement determination data S4 from the state variable S, and judges whether the spindle in the current state is one which has been determined as requiring the replacement in the last state. If it is judged that the spindle in the current state is one which has been determined as requiring the replacement in the last state, the function updating section 18 applies, at step U3, a negative reward R (corresponding to B3 (spindle loss) in the profit-and-loss data B) concurrently determined by the reward calculating section 16 to the updating formula of the function Q, and updates, at step U4, the action value table with use of the state variable S, the profit-and-loss data B, the reward R and the value (or the updated function Q) of the action value, defined in the current state.

If it is judged, at step U2, that the spindle in the current state is not one which has been determined as requiring the replacement in the last state, the function updating section 18 extracts, at step U5, the processing accuracy data S2 from the state variable S, and judges whether the difference between the actual dimension and dimension target value of a processed workpiece, the processing of which has been started after the last state and currently finished by the spindle in the current state, is equivalent to a good workpiece. If the difference is equivalent to the good workpiece, the function updating section 18 applies, at step U6, a positive reward R (corresponding to B1 (workpiece profit) in the profit-and-loss data B) concurrently determined by the reward calculating section 16 to the updating formula of the function Q, and updates, at step U4, the action value table with use of the state variable S, the profit-and-loss data B, the reward R and the value (or the updated function Q) of the action value, defined in the current state.

If it is judged, at step U5, that the processed workpiece, the processing of which has been currently finished by the spindle in the current state, is not equivalent to the good workpiece, the function updating section 18 applies, at step S3, a negative reward R (corresponding to B2 (workpiece loss) in the profit-and-loss data B) concurrently determined by the reward calculating section 16 to the updating formula of the function Q, and updates, at step U4, the action value table in the equivalent way. After the update of the action value table is completed, the learning flow returns to step U1, and the function updating section 18 refers to the updated action value table and randomly selects an action to be performed in the subsequent state represented by the state variable S which has been changed due to the action selected at the previously executed step U1 in the last learning flow. The learning section 14' repeats steps U1 to U6, and thereby repeatedly updates the action value table, so as to proceed with the learning of the condition C.

The configuration of the aforementioned machine learning unit 10 or 10' can be explained as a machine learning method executed by a CPU of a computer. The machine learning method has a configuration of learning a condition C associated with replacement of a spindle of a machine tool, which is characterized by the acts, executed by a CPU of a computer, of observing a state variable S representing a current state of a spindle, during a continuous operation of a machine tool, the state variable including processing volume data S1 showing a total number of processed workpieces which are processed using the spindle, processing accuracy data S2 showing a difference between an actual dimension of a processed workpiece and a dimension target value thereof, interruption time data S3 showing a time period of interruption of operation of the machine tool, and replacement determination data S4 showing a judgment result of a necessity of spindle replacement; providing profit-and-loss data B including a profit B1 per unit time or a loss B2 per unit time, which may be generated by a production of the processed workpiece, and a loss B3 per unit time which may be generated due to the spindle replacement; and using the state variable S and the profit-and-loss data B and learning a condition C associated with the spindle replacement.

Figure 4:
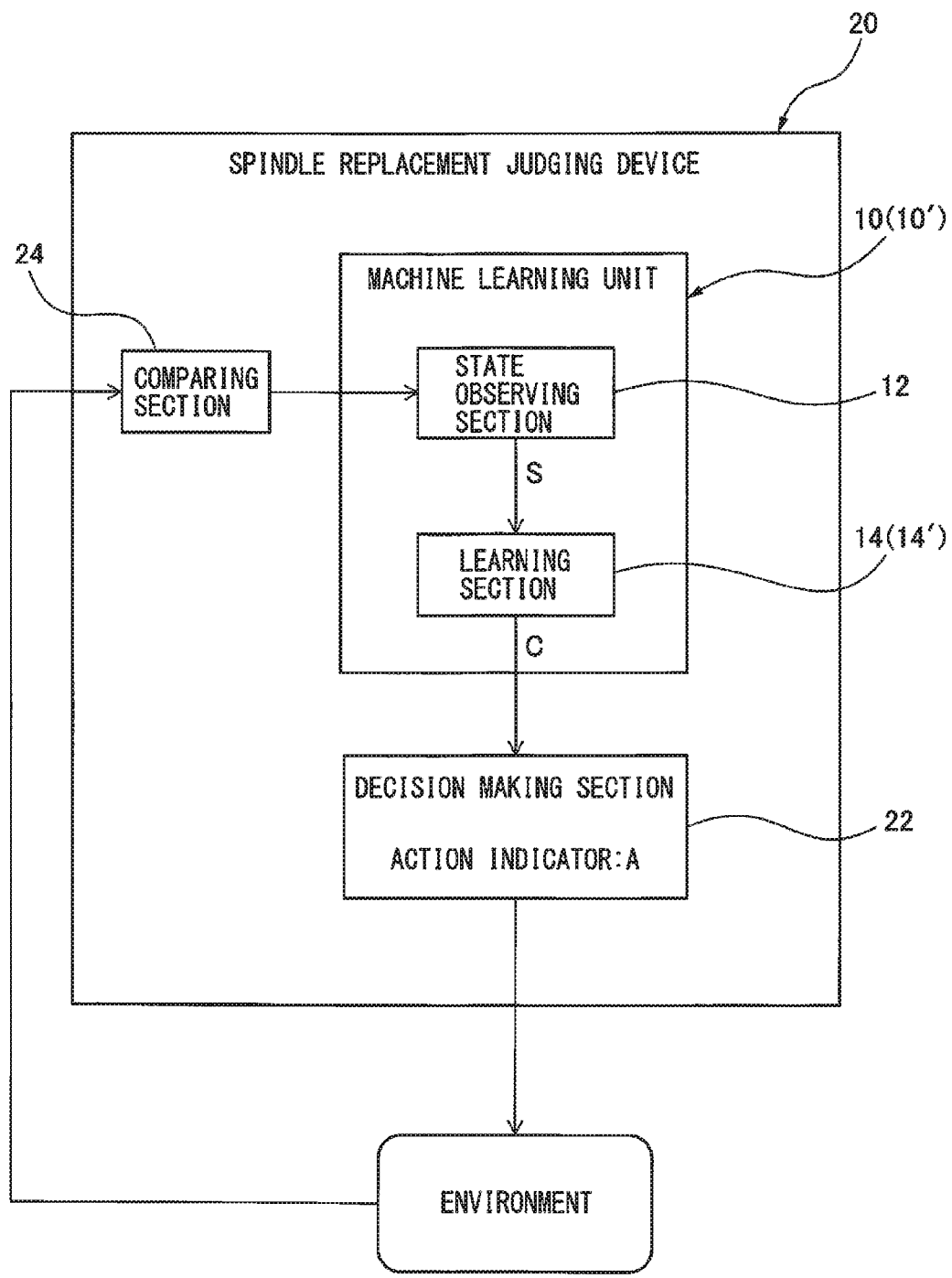
FIG. 4 is a functional block diagram depicting a spindle replacement judging device according to one embodiment.

FIG. 4 depicts a spindle replacement judging device 20 according to one embodiment and including a machine learning unit 10 or 10'. The spindle replacement judging device 20 includes, in addition to software (a learning algorithm, etc.) and hardware (a CPU of a computer, etc.), provided for learning by itself a condition C associated with replacement of a spindle (not depicted) of a machine tool (e.g., a machining center, a lathe, etc.) through a machine learning, software (a judgment algorithm, etc.) and hardware (a CPU of a computer, etc.), provided for judging whether the spindle replacement in a current state is necessary based on the learned condition C. The spindle replacement judging device 20 may be configured so that a single common CPU executes the learning algorithm, the judgment algorithm, and all other software.

The spindle replacement judging device 20 includes the aforementioned machine learning unit 10 (or 10'); and a decision making section 22 configured to output an action indicator A indicating either one of an intention that the spindle replacement is necessary in the current state and an intention that the spindle replacement is not necessary in the current state, based on a result of learning performed by the learning section 14 (or 14').

The decision making section 22 may be configured as, e.g., one of the functions of a CPU of a computer. The decision making section 22 judges whether the spindle replacement in the current state is necessary, in accordance with any judgment algorithm, based on the condition C learned by the machine learning unit 10 (10') (i.e., data set representing the correlativity between current state of the spindle of the continuously operating machine tool and the actions of replacing and not replacing the spindle in the current state), and outputs the result of the judgment as the action indicator A. If the decision making section 22 outputs an action indicator A indicating the intention that the spindle replacement is necessary, the state of the environment (i.e., the interruption time data S3 and the replacement determination data S4, in the state variable S of the spindle) changes accordingly. If the decision making section 22 outputs an action indicator A indicating the intention that the spindle replacement is unnecessary, the state of the environment (i.e., the processing volume data S1 and the processing accuracy data S2, in the state variable S of the spindle) changes accordingly.

The state observing section 12 observes the state variable S which has been changed in accordance with the action indicator A output by the decision making section 22. The learning section 14 (14') uses the changed state variable S to update the value function Q (i.e., the action value table), and thereby learns the condition C. The decision making section 22 outputs the action indicator A which has been optimized in accordance with the state variable S under the learned condition C. By repeating the above cycle, the spindle replacement judging device 20 proceeds with the learning of the condition C executed by the machine learning unit 10 (10'), and gradually improves the reliability of the judgment of the necessity of the spindle replacement.

If the decision making section 22 outputs the action indicator A indicating the intention that the spindle replacement is necessary, the need to actually replace the spindle arises in the environment. However, at the stage where the attainment level of the learning of the condition C by the machine learning unit 10 (10') (i.e., the reliability of the judgment of the necessity of the spindle replacement) has not yet reached a required level, the spindle replacement, performed in accordance with the action indicator A output by the decision making section 22, could lead to a wasteful loss. In order to avoid the wasteful spindle replacement at the stage of learning in progress, a configuration may be adopted, wherein, e.g., if the decision making section 22 outputs the action indicator A indicating the intention that the spindle replacement is necessary, the learning section 14 (14') autonomously changes the state variable S of the spindle which has not actually been replaced, to a state variable S representing a state after being replaced, after a predetermined time (e.g., a few seconds) elapses. Also, a configuration may be adopted, wherein when the decision making section 22 outputs the action indicator A indicating the intention that the spindle replacement is necessary, e.g., the controller of the machine tool performs a control to interrupt the continuous operation of the machine tool, and further wherein when the learning section 14 (14') autonomously changes the state variable S of the spindle to a state variable S after being replaced, the controller releases the interruption of operation and resumes the continuous operation. Note that the judgment as to whether or not the attainment level of the learning of the condition C by the machine learning unit 10 (10') (i.e., the reliability of the judgment of the necessity of the spindle replacement) has reached a required level can be performed by an operator at a suitable time after starting the learning.

In the case where the spindle replacement judging device 20 adopts the aforementioned reinforcement learning (in particular, the Q-learning) as the algorithm of machine learning, the reward R determined by the reward calculating section 16 of the learning section 14' (FIG. 2) is used as reward $r_{t+1}$ received as a result of the change of the state from $s_L$ to $s_{L+1}$, in the updating formula of the aforementioned value function Q. In this connection, the identical value is used as the reward R, which is determined unambiguously by, e.g., the aforementioned calculating formula based on the state variable S before being changed, for the respective cases where action "a" causing the change of state "s" (or the state variable S) is one following the action indicator A indicating the necessity of the spindle replacement output from the decision making section 22 (i.e., an action of replacing the spindle) and is the other one following the action indicator A indicating the unnecessity of the spindle replacement output from the decision making section 22 (i.e., an action of not replacing the spindle). In other words, the reward R is not a parameter giving a difference of weighting between two actions selectable for changing the current state of the spindle to the next state (i.e., the action of replacing and the action of not replacing), but rather is a parameter giving a difference of weighting between an action performed when changing the current state of the spindle to the next state (i.e., the action of replacing or the action of not replacing) and an action when changing the next state of the spindle to the state after the next (i.e., the action of replacing or the action of not replacing).

In the case where the spindle replacement judging device 20 adopts the aforementioned reinforcement learning (in particular, the Q-learning) as the algorithm of machine learning, e.g., an algorithm known as "ϵ-greedy method" may be adopted as the judgment algorithm executed by the decision making section 22 for outputting the action indicator A. According to the ϵ-greedy method, the decision making section 22 determines the action indicator A by selecting, from among two actions selectable for changing the current state of the spindle to the next state (i.e., the action of replacing and the action of not replacing), an action involving the larger value of the value function Q with a probability of "1-ϵ", and also by randomly selecting either one of the two actions regardless of the value of the value function Q with a probability of "ϵ". When the judgment of the necessity of the spindle replacement (i.e., the determination of the action indicator A) is performed by the above method, it is possible to smoothly proceed with the Q-learning.

In the spindle replacement judging device 20 having the above configuration, the result of the learning executed by the machine learning unit 10 (10') is used, so that it is possible to correctly judge whether or not the extent of an abnormal operation of the spindle of the machine tool exceeds an allowable range, and therefore, whether or not it is necessary to replace the spindle with a new one, without relying on a detection value easily affected by disturbance, such as the detected value of a vibration sensor, and also on the experimental rule of an operator.

As depicted in FIG. 4, the spindle replacement judging device 20 may further include a comparing section 24 configured to compare the difference between the actual dimension of the processed workpiece and the dimension target value thereof with a predetermined tolerance of the processed workpiece. In this configuration, the state observing section 12 is configured to observe a result of comparison by the comparing section 24 as the processing accuracy data S2 in the state variable S. The result of comparison by the comparing section 24 may be represented in the form of a numerical value, ratio, level, etc., as explained. According to this configuration, the learning section 14 (14') can make, based on the result of comparison of the comparing section 24, observed by the state observing section 12, a judgment that the processing accuracy data S2 reflects a good workpiece when the difference between the actual dimension and the dimension target value, of the processed workpiece, is not greater than the tolerance and, e.g., the reward calculating section 16 (FIG. 2) determines a workpiece profit B1 as a reward R, while a judgment that the processing accuracy data S2 reflects a defective workpiece when the difference between the actual dimension and the dimension target value, of the processed workpiece, is greater than the tolerance and, e.g., the reward calculating section 16 (FIG. 2) determines a workpiece loss B2 as a reward R.

The larger the tolerance set for the processed workpiece (i.e., the lower the level of a dimensional accuracy required for the processed workpiece), the larger the difference between the actual dimension and the dimension target value, of the good workpiece producing the workpiece profit B1. The smaller the tolerance set for the processed workpiece (i.e., the higher the level of a dimensional accuracy required for the processed workpiece), the smaller the difference between the actual dimension and the dimension target value, of the good workpiece producing the workpiece profit B1. Accordingly, the learning section 14 (14') can learn the condition C while aiming at an optimum solution depending on the tolerance of the processed workpiece.

Figure 5:
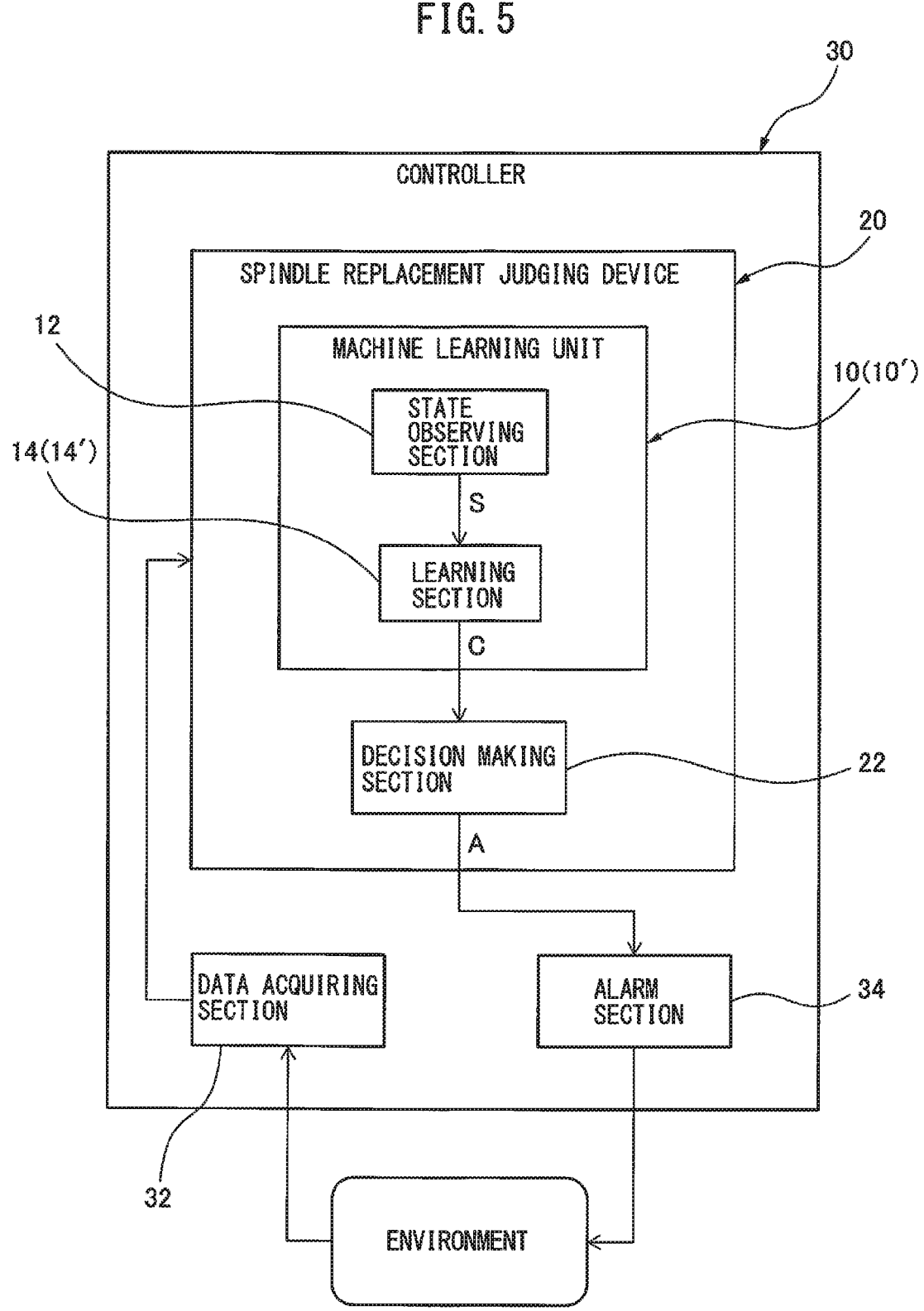
FIG. 5 is a functional block diagram depicting a controller according to one embodiment.

FIG. 5 depicts a controller 30 according to one embodiment and including a spindle replacement judging device 20. The controller 30 includes, in addition to software (a learning algorithm, etc.) and hardware (a CPU of a computer, etc.), provided for learning by itself a condition C associated with replacement of a spindle (not depicted) of a machine tool (e.g., a machining center, a lathe, etc.) through a machine learning as well as software (a judgment algorithm, etc.) and hardware (a CPU of a computer, etc.), provided for judging whether the spindle replacement in a current state is necessary based on the learned condition C, software (a control algorithm, etc.) and hardware (a CPU of a computer, etc.), provided for controlling the operation of the machine tool. The controller 30 may be configured so that a single common CPU executes the learning algorithm, the judgment algorithm, the control algorithm, and all other software.

The controller 30 includes the aforementioned spindle replacement judging device 20 and a data acquiring section 32 configured to acquire the processing volume data S1, the processing accuracy data S2, the interruption time data S3 and the replacement determination data S4, of the state variable S observed by the state observing section 12. The data acquiring section 32 can acquire the data S1 to S4 of the state variable S from functions of the controller 30, such as a number count function, a timer function, an alarm function, and a dimension measuring device provided for the machine tool, as explained.

In the controller 30 having the above configuration, the spindle replacement judging device 20 is incorporated therein, so that it is possible, with use of the result of the learning executed by the machine learning unit 10 (10'), to correctly judge whether or not the extent of an abnormal operation of the spindle of the machine tool exceeds an allowable range, and therefore, whether or not it is necessary to replace the spindle with a new one, without relying on a detection value easily affected by disturbance, such as the detected value of a vibration sensor, and also on the experimental rule of an operator.

As depicted in FIG. 5, the controller 30 may further include an alarm section 34 configured to output a signal for informing a demand for the spindle replacement in a case where the action indicator A output by the decision making section 22 indicates the intention that the spindle replacement is necessary. When the alarm section 34 outputs the signal informing a spindle replacement demand, an optional peripheral device may convert the spindle replacement demand to, e.g., sound, light, image, etc., so as to draw the attention of an operator. The controller 30 may stop with an emergency all of the operations of the machine tool when the alarm section 34 outputs the signal informing the spindle replacement demand.

If the alarm section 34 outputs the signal informing the spindle replacement demand when the processing of one workpiece is finished under the control of the controller 30, the state of the environment (i.e., the interruption time data S3 and the replacement determination data S4, in the state variable S of the spindle) changes accordingly. If the alarm section 34 does not output the signal informing the spindle replacement demand when the processing of one workpiece is finished under the control of the controller, the state of the environment (i.e., the processing volume data S1 and the processing accuracy data S2, in the state variable S of the spindle) changes accordingly. The operator can judge how the state of the environment (i.e., the state variable S of the spindle) has changed, based on the presence or absence of the information signal output from the alarm section 34.

Figure 6:
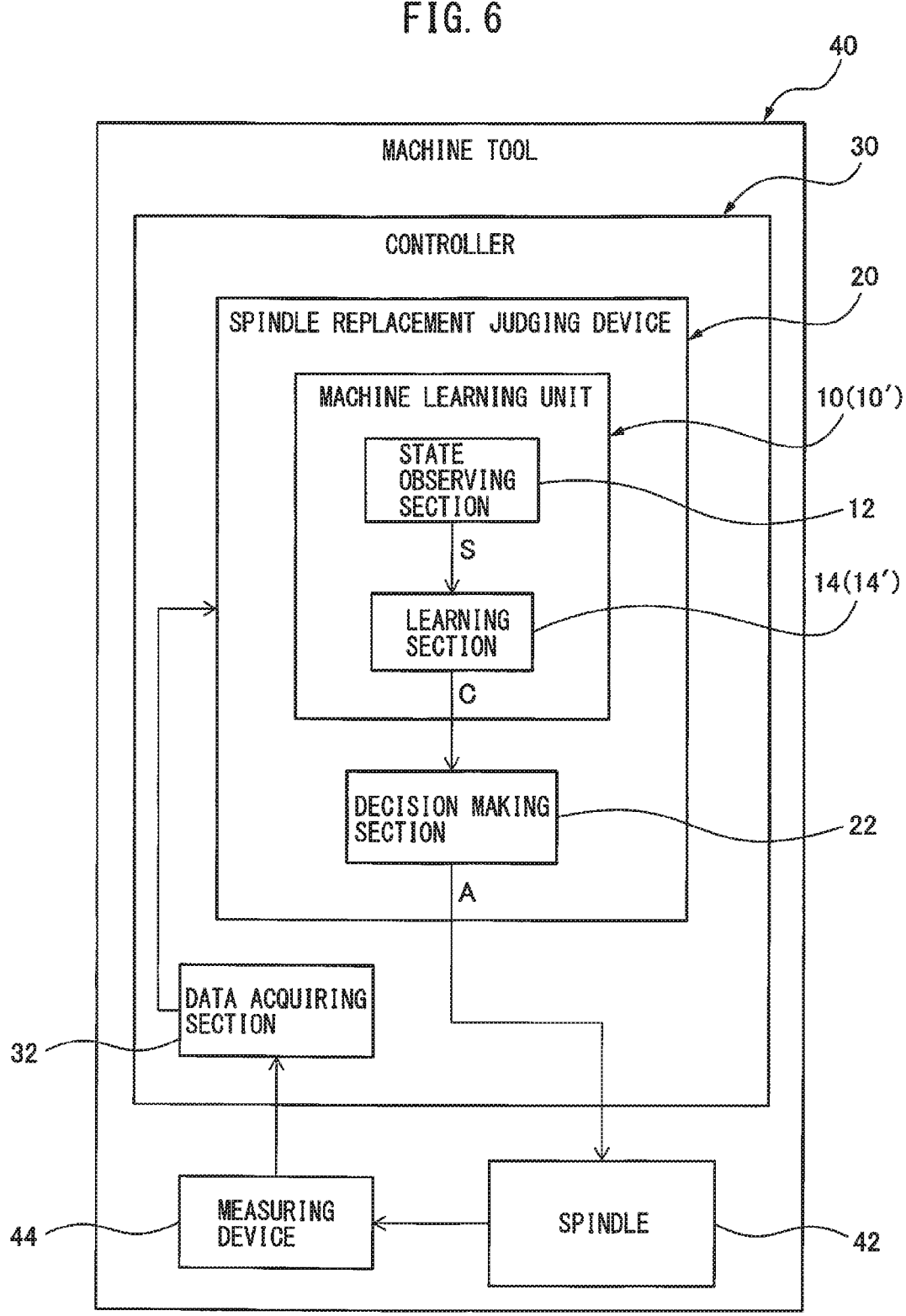
FIG. 6 is a functional block diagram depicting a machine tool according to one embodiment.

FIG. 6 depicts a machine tool 40 according to one embodiment and including a controller 30. The machine tool 40 is configured as, e.g., a machining center, a lathe, etc., and includes a spindle 42 rotatable while holding a tool or a workpiece. The machine tool 40 can move the spindle 42 or other movable parts on command, in accordance with, e.g., a numerical control algorithm executed by the controller 30.

In the machine tool 40 having the above configuration, the controller 30 is included, so that it is possible, with use of the result of the learning executed by the machine learning unit 10 (10'), to correctly judge whether or not the extent of an abnormal operation of the spindle 42 exceeds an allowable range, and therefore, whether or not it is necessary to replace the spindle 42 with a new one, without relying on a detection value easily affected by disturbance, such as the detected value of a vibration sensor, and also on the experimental rule of an operator.

As depicted in FIG. 6, the machine tool 40 may further include a measuring device 44 configured to measure the difference between the actual dimension of the processed workpiece and the dimension target value thereof in a two or three dimensional manner. The measuring device 44 may include a contact-type measuring mechanism using a probe, etc., or a noncontact-type measuring mechanism using light, sound wave, etc. The data acquiring section 32 can acquire the processing accuracy data S2 in the state variable S observed by the state observing section 12, based on the result of the measurement of the measuring device 44.

Although not depicted, as a modification of the machine tool 40, a configuration may be adopted, which includes a controller exclusively used to control the operation of the machine tool 40 and the spindle replacement judging device 20 having a CPU separate from that of the controller for exclusive use.

Figure 7:
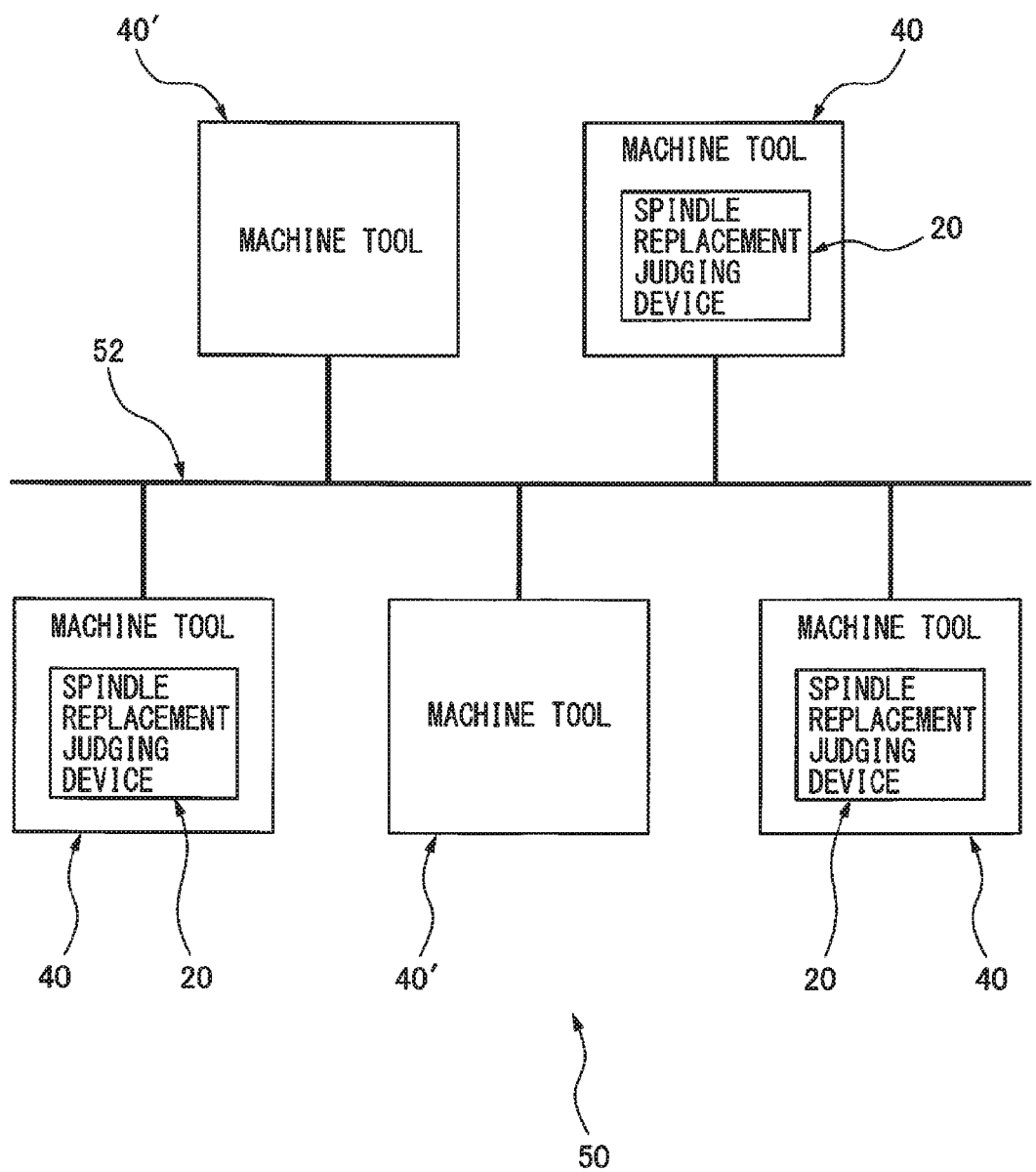
FIG. 7 is a functional block diagram depicting a production system according to one embodiment.

FIG. 7 depicts a production system 50 according to one embodiment and including a machine tool 40. The production system 50 includes a plurality of machine tools 40, 40' having the identical mechanical construction and a network 52 configured to connect the machine tools 40, 40' with each other, and at least one of the plurality of machine tools 40, 40' is configured as the machine tool 40 including the spindle replacement judging device 20 (or the controller 30). The production system 50 may also include a machine tool 40' which does not include the spindle replacement judging device 20 (or the controller 30). The machine tool 40' may include a spindle 42 (FIG. 6) and a controller exclusively used to control the operation of the machine tool 40'.

In the production system 50 having the above configuration, the machine tool 40 including the spindle replacement judging device 20, among the plurality of machine tools 40, 40', can use the result of the learning executed by the machine learning unit 10 (10'), and thereby makes it possible to correctly judge whether or not the extent of an abnormal operation of its own spindle 42 exceeds an allowable range, and therefore, whether or not it is necessary to replace the spindle 42 with a new one, without relying on a detection value easily affected by disturbance, such as the detected value of a vibration sensor, and also on the experimental rule of an operator. Further, the system may be configured so that the spindle replacement judging device 20 of at least one machine tool 40 learns a condition C common to all of the machine tools 40, 40', based on the state variables S of the spindles 42 obtained in connection respectively with the other machine tools 40, 40', and that the result of the learning is shared by all of the machine tools 40, 40'. Therefore, according to the production system 50, it is possible to improve the learning speed or reliability of the condition C with an input of a more diverse data set (including the state variables S and the profit-and-loss data B).

Figure 8:
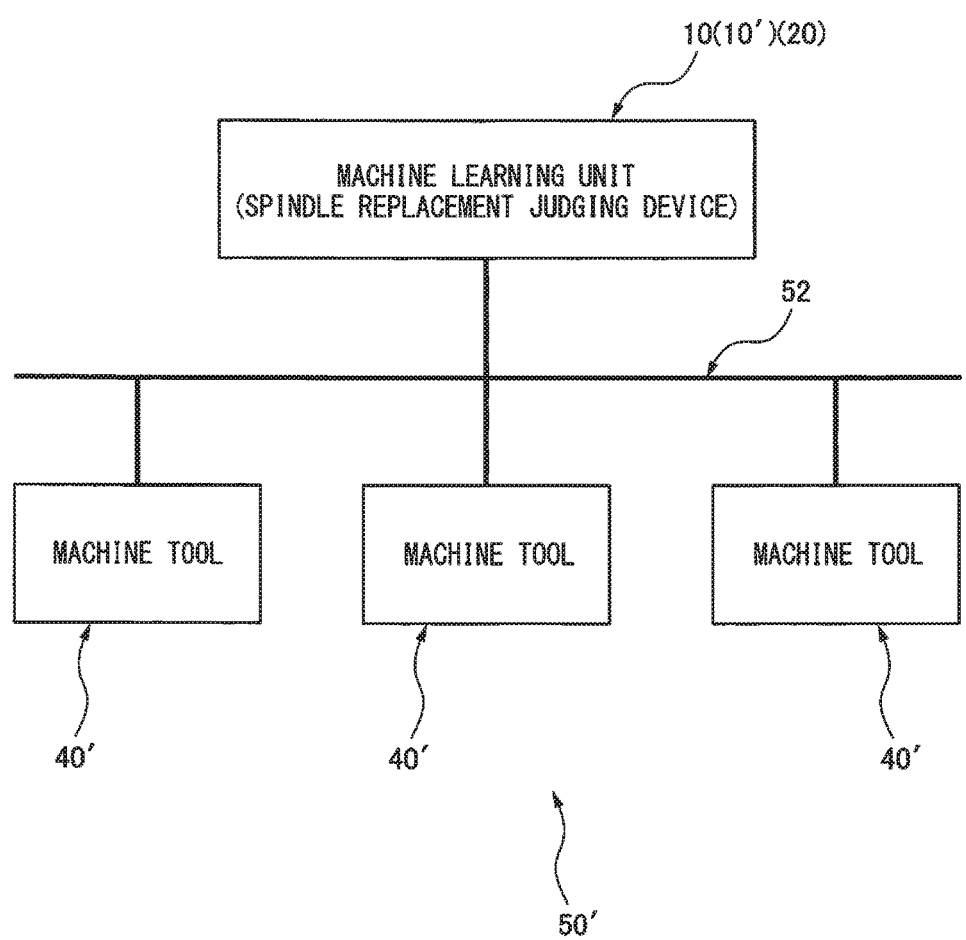
FIG. 8 is a functional block diagram depicting a production system according to another embodiment.

FIG. 8 depicts a production system 50' according to another embodiment and including a machine tool 40'. The production system 50' includes a machine learning unit 10 (10') or a spindle replacement judging device 20, a plurality of machine tools 40' having the identical mechanical construction, and a network 52 configured to connect the machine tools 40' and the machine learning unit 10 (10') or the spindle replacement judging device 20 with each other.

In the production system 50' having the above configuration, the machine learning unit 10 (10') or the spindle replacement judging device 20 can learn a condition C common to all of the machine tools 40', based on the state variables S of the spindles 42 obtained in connection respectively with the plurality of machine tools 40', and with use of the result of the learning, makes it possible to correctly judge whether or not the extent of an abnormal operation of each spindle 42 exceeds an allowable range, and therefore, whether or not it is necessary to replace the spindle 42 with a new one, without relying on a detection value easily affected by disturbance, such as the detected value of a vibration sensor, and also on the experimental rule of an operator.

The production system 50' may have a configuration wherein the machine learning unit 10 (10') or the spindle replacement judging device 20 is present in a cloud server provided in the network 52. According to this configuration, it is possible to connect the required number of machine tools 40' with the machine learning unit 10 (10') or the spindle replacement judging device 20 when needed, regardless of locations or moments where each of the plurality of machine tools 40' exists.

An operator engaged in the production system 50, 50' can perform a judgment as to whether or not the attainment level of the learning of the condition C by the machine learning unit 10 (10') (i.e., the reliability of the judgment of the necessity of the spindle replacement) has reached a required level, at a suitable timing after the start of the learning by the machine learning unit 10 (10'). The judgment may be performed in such a manner that, e.g., when the alarm section 34 of the controller 30 of the machine tool 40 outputs a signal informing a spindle replacement demand, and before the learning section 14 (14') performs a process to autonomously change the state variable S of the spindle to a state variable S after being replaced, the operator performs a work to maintain the interruption of operation of the machine tool 40 and conduct the on-site verification and validation of the result of the judgment in which the replacement of the spindle 42 is necessary in the current state. In the production system 50, 50', only the judgment of the attainment level of the learning is an essential work which has to be performed by the operator, while according to the prior art wherein an operator relies only on his experimental rule to predict the malfunction of the spindle, it is required for the operator to continuously perform several works for the plurality of machine tools 40, 40', such as the checking of abnormal noise or vibration or the inspection of the processing accuracy of a workpiece. Therefore, according to the production system 50, 50', it is possible to cut personnel costs in connection with an operator and improve the operating rates of the machine tools 40, 40'.

While the configurations of various embodiments of the present invention have been explained based on the drawings, the present invention is not limited to the above-described configurations. For example, the learning algorithm executed by the machine learning unit 10 (10'), the judgment algorithm executed by the spindle replacement judging device 20, the control algorithm executed by the controller 30, etc., are not limited to the aforementioned ones, and various other algorithms may be adopted.

While the invention has been described with reference to specific embodiments, it will be understood, by those skilled in the art, that various changes or modifications may be made thereto without departing from the scope of the following claims.

The invention claimed is:

1. A machine learning unit configured to learn a condition associated with replacement of a spindle of a machine tool, the machine learning unit comprising:
 a state observing section configured to observe a state variable representing a current state of a spindle, during a continuous operation of a machine tool, the state variable comprising processing volume data showing a total number of processed workpieces which are processed using the spindle, processing accuracy data showing a difference between an actual dimension of a processed workpiece and a dimension target value, interruption time data showing a time period of interruption of operation of the machine tool, and replacement determination data showing a judgment result of a necessity of spindle replacement; and
 a learning section provided with profit-and-loss data, the profit-and-loss data comprising a profit per unit time or a loss per unit time, which may be generated by a production of the processed workpiece, and a loss per unit time which may be generated due to the spindle replacement, the learning section configured to use the profit-and-loss data and the state variable and learn a condition associated with the spindle replacement.

2. The machine learning unit of claim 1, wherein the learning section is configured to use state variables and profit-and-loss data, which are obtained in connection respectively with a plurality of machine tools, and learn a condition in connection with each of the plurality of machine tools.

3. The machine learning unit of claim 1, wherein the learning section comprises:
 a reward calculating section configured to calculate the profit-and-loss data based on the state variable and thereby determine a reward for an action relating to the spindle replacement in the current state; and a function updating section configured to use the reward and update a function expressing a value of the action in the current state, the learning section configured to learn the condition when the function updating section repeatedly updates the function.

4. A spindle replacement judging device configured to judge a necessity of replacement of a spindle of a machine tool, the spindle replacement judging device comprising:

a machine learning unit according to claim 1; and a decision making section configured to output an action indicator indicating either one of an intention that the spindle replacement is necessary in the current state and an intention that the spindle replacement is not necessary in the current state, based on a result of learning performed by the learning section, wherein the state observing section is configured to observe the state variable which has been changed in accordance with the action indicator output by the decision making section, wherein the learning section is configured to use the changed state variable so as to learn the condition, and wherein the decision making section is configured to output the action indicator which has been optimized in accordance with the state variable under the learned condition.

5. The spindle replacement judging device of claim 4, further comprising a comparing section configured to compare the difference between the actual dimension of the processed workpiece and the dimension target value with a predetermined tolerance of the processed workpiece, wherein the state observing section is configured to observe a result of comparison by the comparing section as the processing accuracy data.

6. A controller of a machine tool having a spindle, the controller comprising:

a spindle replacement judging device according to claim 4; and a data acquiring section configured to acquire the processing volume data, the processing accuracy data, the interruption time data and the replacement determination data.

7. The controller of claim 6, further comprising an alarm section configured to output a signal for informing a demand for the spindle replacement in a case where the action indicator output by the decision making section indicates the intention that the spindle replacement is necessary.

8. A machine tool comprising:
a spindle; and a spindle replacement judging device according to claim 4.

9. A machine tool comprising:
a spindle; and
a controller according to claim 6.

10. The machine tool of claim 8, further comprising a measuring device configured to measure the difference between the actual dimension of the processed workpiece and the dimension target value.

11. A production system comprising:

a plurality of machine tools, each machine tool having a spindle; and a network configured to connect the plurality of machine tools with each other, wherein at least one of the plurality of machine tools is configured as a machine tool according to claim 8.

12. A production system comprising:

a plurality of machine tools, each machine tool having a spindle;

a machine learning unit according to claim 1; and a network configured to connect the plurality of machine tools and the machine learning unit with each other.

13. The production system of claim 12, wherein the machine learning unit is present in a cloud server.

14. A machine learning method of learning a condition associated with replacement of a spindle of a machine tool, the machine learning method comprising the acts, executed by a CPU of a computer, of:

observing a state variable representing a current state of a spindle, during a continuous operation of a machine tool, the state variable comprising processing volume data showing a total number of processed workpieces which are processed using the spindle, processing accuracy data showing a difference between an actual dimension of a processed workpiece and a dimension target value, interruption time data showing a time period of interruption of operation of the machine tool, and replacement determination data showing a judgment result of a necessity of spindle replacement;

providing profit-and-loss data comprising a profit per unit time or a loss per unit time, which may be generated by a production of the processed workpiece, and a loss per unit time which may be generated due to the spindle replacement; and using the state variable and the profit-and-loss data and learning a condition associated with the spindle replacement.

* * * * *